(12) United States Patent
Mustafa

(10) Patent No.: US 10,376,086 B1
(45) Date of Patent: Aug. 13, 2019

(54) APPARATUS TO ADJUSTABLY AND REMOVABLY ATTACH A PAIR OF CURTAIN ROD RETAINERS TO THE HEAD RAIL OF A WINDOW BLIND AND TO ADJUST FOR DIFFERENT THICKNESSES OF A HEAD RAIL

(71) Applicant: Na'im Mustafa, Valley Village, CA (US)

(72) Inventor: Na'im Mustafa, Valley Village, CA (US)

(*) Notice: Subject to any disclaimer, the term of this patent is extended or adjusted under 35 U.S.C. 154(b) by 165 days.

(21) Appl. No.: 15/484,028

(22) Filed: Apr. 10, 2017

(51) Int. Cl.
  *A47H 1/122* (2006.01)
  *A47H 1/142* (2006.01)
  *F16M 13/02* (2006.01)
  *F16B 2/12* (2006.01)

(52) U.S. Cl.
  CPC .............. *A47H 1/122* (2013.01); *A47H 1/142* (2013.01); *F16B 2/12* (2013.01); *F16M 13/022* (2013.01)

(58) Field of Classification Search
  CPC . A47H 1/02; A47H 1/10; A47H 1/102; A47H 1/12; A47H 1/122; A47H 1/124; A47H 1/13; A47H 1/14; A47H 1/142; F16B 2/12; F16M 13/022
  USPC ....... 248/252, 254, 256, 257, 258, 259, 261, 248/262, 264, 265, 229.12, 229.22, 228.3, 248/231.41; D8/368, 380
  See application file for complete search history.

(56) References Cited

U.S. PATENT DOCUMENTS

| | | | | |
|---|---|---|---|---|
| 565,419 A | * | 8/1896 | Bair et al. | A47H 1/13 248/252 |
| 720,069 A | * | 2/1903 | Reigard | A47H 1/122 248/265 |
| 1,095,551 A | | 5/1914 | Collier | |
| 1,230,813 A | * | 6/1917 | Sly | A47H 1/13 248/254 |
| 1,876,478 A | * | 9/1932 | Van Duzer | A01K 97/10 248/156 |
| 2,386,854 A | | 10/1945 | Hilton | |
| 2,738,154 A | | 3/1956 | Mason | |
| 2,902,243 A | | 9/1959 | Atwood | |
| 2,918,245 A | * | 12/1959 | Cameron | A47H 1/124 248/263 |

(Continued)

OTHER PUBLICATIONS

The NoNo Bracket Company, NoNo Bracket—Curtain Rod Bracket attachment for Outside Mount Vertical Blinds, Sep. 2016, https://www.amazon.com/NoNo-Bracket-Curtain-attachment-Vertical/dp/B01LMQOPPG/ref=cm_cr_arp_d_product_top?ie=UTF8. (Year: 2016).*

*Primary Examiner* — Jonathan Liu
*Assistant Examiner* — Guang H Guan
(74) *Attorney, Agent, or Firm* — Thomas I. Rozsa

(57) ABSTRACT

A curtain rod bracket attachment member formed in two main sections which are slidably attached to each other. A first main section having an elongated section extending at one end to a first transverse retaining wall which is oriented perpendicular to the elongated section. A curtain rod retaining member extends at an opposite end of the elongated section to a curtain rod retaining section into which a curtain rod is placed and retained. A second main section includes a second transverse retaining wall and is slidably affixed to the elongated section of the main section to enable a distance between parallel first and second transverse retaining walls to be modified.

12 Claims, 5 Drawing Sheets

(56) References Cited

U.S. PATENT DOCUMENTS

| | | | | |
|---|---|---|---|---|
| 3,104,086 A | * | 9/1963 | Salzmann | A47H 1/122 |
| | | | | 160/345 |
| 3,199,823 A | * | 8/1965 | Stall | A47H 1/122 |
| | | | | 248/207 |
| 3,430,908 A | * | 3/1969 | Kowalczyk | A47H 1/102 |
| | | | | 211/105.2 |
| 3,889,912 A | * | 6/1975 | Ray | A47H 1/14 |
| | | | | 248/255 |
| 4,140,294 A | * | 2/1979 | Zwarts | A47H 1/122 |
| | | | | 248/265 |
| 4,322,050 A | * | 3/1982 | Roach | A47H 1/122 |
| | | | | 248/222.51 |
| 4,684,095 A | | 8/1987 | Athey | |
| 6,672,559 B1 | * | 1/2004 | Boldia | A01K 97/10 |
| | | | | 248/534 |
| 7,134,470 B2 | | 11/2006 | McCance | |
| 7,198,088 B2 | | 4/2007 | McMenamin | |
| 7,322,552 B1 | | 1/2008 | Lin | |
| 9,609,974 B2 | * | 4/2017 | Mateer | A47H 1/102 |
| D808,576 S | * | 1/2018 | Clarke | A47H 1/124 |
| | | | | D26/138 |
| 10,123,647 B1 | * | 11/2018 | Mustafa | A47H 1/142 |
| 2007/0257172 A1 | | 11/2007 | Kelly | |

* cited by examiner

US 10,376,086 B1

APPARATUS TO ADJUSTABLY AND REMOVABLY ATTACH A PAIR OF CURTAIN ROD RETAINERS TO THE HEAD RAIL OF A WINDOW BLIND AND TO ADJUST FOR DIFFERENT THICKNESSES OF A HEAD RAIL

BACKGROUND OF THE INVENTION

1. Field of the Invention

The present invention relates to the field of interior decorating and in particular to hanging curtains over an area in front of a window which curtains are visible from an interior of the room in which the window is located to increase the interior beauty of a room and/or at a location adjacent a window to provide an attractive appearance when the window is view from a location exterior to the room in which the window is located.

2. Description of the Prior Art

The following nine patents and published patent application are closest prior art known to the inventor:
1. U.S. Pat. No. 1,095,551 issued to Skinner A. Collier on May 5, 1914 for "Combination Shade and Curtain Bracket" (hereafter the "Collier Patent");
2. U.S. Pat. No. 2,386,854 issued to William Hilton on Oct. 16, 1945 for "Curtain Bracket" (thereafter the "Hilton Patent");
3. U.S. Pat. No. 2,738,154 issued to Homer R. Mason on Mar. 13, 1966 for "Hanger" (hereafter the "Mason Patent");
4, U.S. Pat. No. 32,902,243 issued to Harold T. Atwood on Sep. 1, 1959 for "Rod Support Structure" (hereafter the "Atwood Patent");
5. U.S. Pat. No. 4,684,095 issued to Wilber J. Athey on Aug. 4, 1987 for "Curtain Rod and Window Shade Holder" (hereafter the "Athey Patent");
6. U.S. Pat. No. 7,134,470 issued to Patrick McCance on Nov. 14, 2008 for "Window Covering Support Device and Method of Use Thereof" (hereafter the "McCance Patent");
7. U.S. Pat. No. 7,198,088 issued to Tim McMenamin et al. on Apr. 3, 2007 for "Blind/Curtain Mounting Bracket For Rods" (hereafter the "McMenamin Patent");
8. United States Published Patent Application No. 2007/0252172 to David A. Kelly on Nov. 8, 2007 for "Mounting System and Bracket for Window Treatment" (hereafter the "Kelly Published Patent Application");
9. U.S. Pat. No. 7,322,552 issued to Wen-Jui Lin on Jan. 29, 2008 for "Curtain Rod Support" (hereafter the "Lin Patent").

The Collier Patent discloses a two piece device which hangs over the window blind bracket and then has a mechanism for inserting the curtain rod support portion wherein the curtain rod can be hung over it. The device disclosed in this patent does not have a mechanism to tighten the device to the window blind bracket, which does not have any feature to accommodate different depths of a window blind brackets and any mechanism to prevent movement of the curtain rod.

The Hilton Patent discloses a one piece device which hangs over the window blind bracket and then has a mechanism for inserting the curtain rod support portion wherein the curtain rod can be hung over it. The device disclosed in this patent does not have a mechanism to tighten the device to the window blind bracket, which does not have any feature to accommodate different depths of a window blind brackets and any mechanism to prevent movement of the curtain rod.

The Mason Patent is a complex mechanism referred to as a hanger to facilitate hanging if items including venetian blinds and curtains.

The Atwood Patent discloses a multi-component device to support the bracket for supporting Venetian blinds other window covering hanging members.

The Athey Patent discloses a device which hangs over the window frame and has a portion which receives a thin curtain rod. The device disclosed in this patent does not have a mechanism to tighten the device to the window blind bracket, which does not have any feature to accommodate different depths of a window blind brackets and any mechanism to prevent movement of the curtain rod.

The McCance Patent discloses a fixed curtain rod supported by fixed brackets.

The McMenamin Patent discloses a complex bracket mounting system. discloses a mounting bracket for curtain rods The Kelly Published Patent Application discloses a mounting system and bracket for window treatments.

The Lin Patent discloses a curtain rod hanging device which requires affixation into a structure such as a wall.

In or about February, 2017, after the present inventor had already developed the invention that is the subject of this patent application, and had started offering for sale products embodying the present invention, a patent attorney forwarded to counsel for the present inventor a document that is allegedly a copy of U.S. patent application Ser. No. 15/269,857, an unpublished patent application (hereafter the "'857 Unpublished Application") claiming that the '857 Unpublished Application discloses and claims an invention that is prior art to the present invention.

SUMMARY OF THE INVENTION

The present invention is an apparatus which is a curtain rod bracket attachment member formed in two main sections which are slidably attached to each other. The curtain rod bracket attachment member includes a first main section having an elongated section extending in a first curved portion at a first end, the curved portion extending to a first transverse retaining member or first transverse retaining wall which is oriented perpendicular to the elongated section.

The elongation section extends at its opposite second end to a second curved portion which extends to a second transverse portion or second transverse wall having an exterior surface and an interior surface which extends to a third curved portion which extends to a semi-circular wall section having an exterior surface and an interior surface which extends to a fourth curved portion which extends to a third transverse portion or third transverse wall having an exterior surface and an interior surface ending in an upper arcuate top portion having an exterior surface and an interior surface.

The second curved portion, the second transverse wall, the third curved portion, the semi-circular wall, the fourth curved portion the third transverse wall and the upper arcuate top wall are one integral unit forming a curtain rod retaining section. The curtain rod retaining section includes a partially open interior channel with a semi-circular bottom and spaced apart second and third transverse walls with an opening between the second curved portion and the interior surface of the upper arcuate top portion, extending to the bottom semi-circular section, an elongated portion of a curtain rod is inserted through the opening and rests on the semi-circular section and between the second and third transverse walls.

Described broadly, the curtain retaining section includes the elongation section extends at its opposite second end to a second curved portion which extends to a second transverse portion or second transverse wall having an exterior surface and an interior surface which extends to a semi-circular wall having an exterior surface and an interior surface which extends to a third transverse portion or third transverse wall having an exterior surface and an interior surface.

Described more broadly, the second curved portion, the second transverse wall, the semi-circular wall, and the third transverse wall are one integral unit forming a curtain rod retaining section. The curtain rod retaining section includes a partially open interior channel with a semi-circular bottom and spaced apart second and third transverse walls with an opening between the second curved portion and the interior surface of the upper arcuate top portion, extending to the bottom semi-circular section, an elongated portion of a curtain rod is inserted through the opening and rests on the semi-circular section and between the second and third transverse walls.

A curtain rod retaining member extends through a location between the third transverse wall and the upper arcuate top portion from exterior to interior surface and comprises a threaded opening between the in third transverse wall and upper arcuate top portion aligned with the second curved portion with a threaded bold extending through the threaded opening, an interior end of the threaded bolt extending into the partially open interior channel and an exterior end of the threaded bolt ending in a flat circular knob.

The elongated section further includes an elongated slot extending from an upper surface of the elongated section to the lower surface of the elongated slot. The curtain rod attachment member includes a second main section having a short elongated portion extending to a fourth curved portion at one end extending to a second transverse retaining member or second transverse retaining wall which is oriented perpendicular to the short elongated section The short elongated section has a threaded opening extending from top surface to its bottom surface. A short threaded bolt extends through the elongated slot and is threaded into the threaded opening. The second transverse retaining wall is oriented parallel to and spaced apart from the first transverse retaining wall with the short elongated section extending away from the first transverse retaining wall. The distance between the first transverse retaining wall and the second transverse retaining wall is modified/adjusted by loosening the short threaded bolt and sliding the short elongated member of the second main section by movement of the position of the second main section by sliding the short threaded bolt along the elongated slot and tightening the short threaded bolt when the desired separation distance is achieved.

Described broadly, the elongated section includes an elongated movement receiving portion extending through a thickness of the elongated section; and a second main section having a short elongated section extending parallel to and adjacent to a lower surface of said elongated section, the short elongated section extending to a second transverse retaining wall which is oriented perpendicular to the short elongated section, the second transverse retaining wall has an interior surface, the short elongated section having a movement receiving and retaining portion, an affixing member movably extending through the elongated movement receiving portion of the elongated section and into and affixed to the movement receiving and retaining portion of the short elongated section, the second transverse retaining wall is oriented parallel to and spaced apart from the first transverse retaining wall, an adjustable distance between the first transverse retaining wall and the second transverse retaining wall facilitated by moving the affixing member to any location within the elongated movement receiving member causing the short elongated section and the second transverse wall to move relative to the first transverse wall until a required distance between the interior surface of the first transverse retaining wall and the interior surface of the second transverse retaining wall is achieved.

In operation, the elongated section of the first main section is placed onto the top of the head rail so that the lower surface of the elongated portion rests on the top of the head rail, the interior surface of the first transverse retaining wall rests against a portion of the transverse rear surface of the head rail and a first or interior facing surface of the second transverse retaining wall rests against a portion of the front transverse surface of the head rail, the short threaded bolt is loosened to move second main section until the interior facing surface of the second transverse retaining wall is press fit tightened against the portion of the front transverse surface of the head rail so that the head rail is press fit retained between the first and second transverse retaining members with a portion of the elongated section of the first main section resting on top of a portion of the head rail. The curtain rod retaining section extends in front of the head rail.

Two such curtain rod attachment members are fastened at spaced apart locations on the head rail. A curtain rod is inserted into parallel curtain rod retaining sections and the knob of the curtain rod retaining member causes the threaded bolt to be fastened against a portion of the curtain rod to prevent the curtain rod from sliding on the curtain rod attachment members.

The object of the present invention is to provide at least a pair of spaced apart curtain rod attachment members which are parallel to each other and adjustable to conform to the depth or thickness from rear surface to front surface of a head rail of vertical venetian blinds or other vertical window shades or horizontal venetian shades or other horizontal window shades with requiring and structural modification to the head rail of any other portion of a wall of a room.

It is a further object of the present invention to provide at least a pair of spaced apart curtain attachment rod members which are removably attached to the head rail.

Additional objects of the present invention include inside mounted blinds curtain rod bracket attachments which: (1) being specially engineered for blind attachment; (2) inside mounted vertical rail blind attachments; (3) adjustable to fit between one (1) inch and one and a half (1½) inch thick or deep head rails; (4) adjustable to fit vertical or mini blinds; (5) no brackets to screw in the wall; (6) no drilling; (7) no hammering; and (9) fits up to one (1) inch diameter curtain rod.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
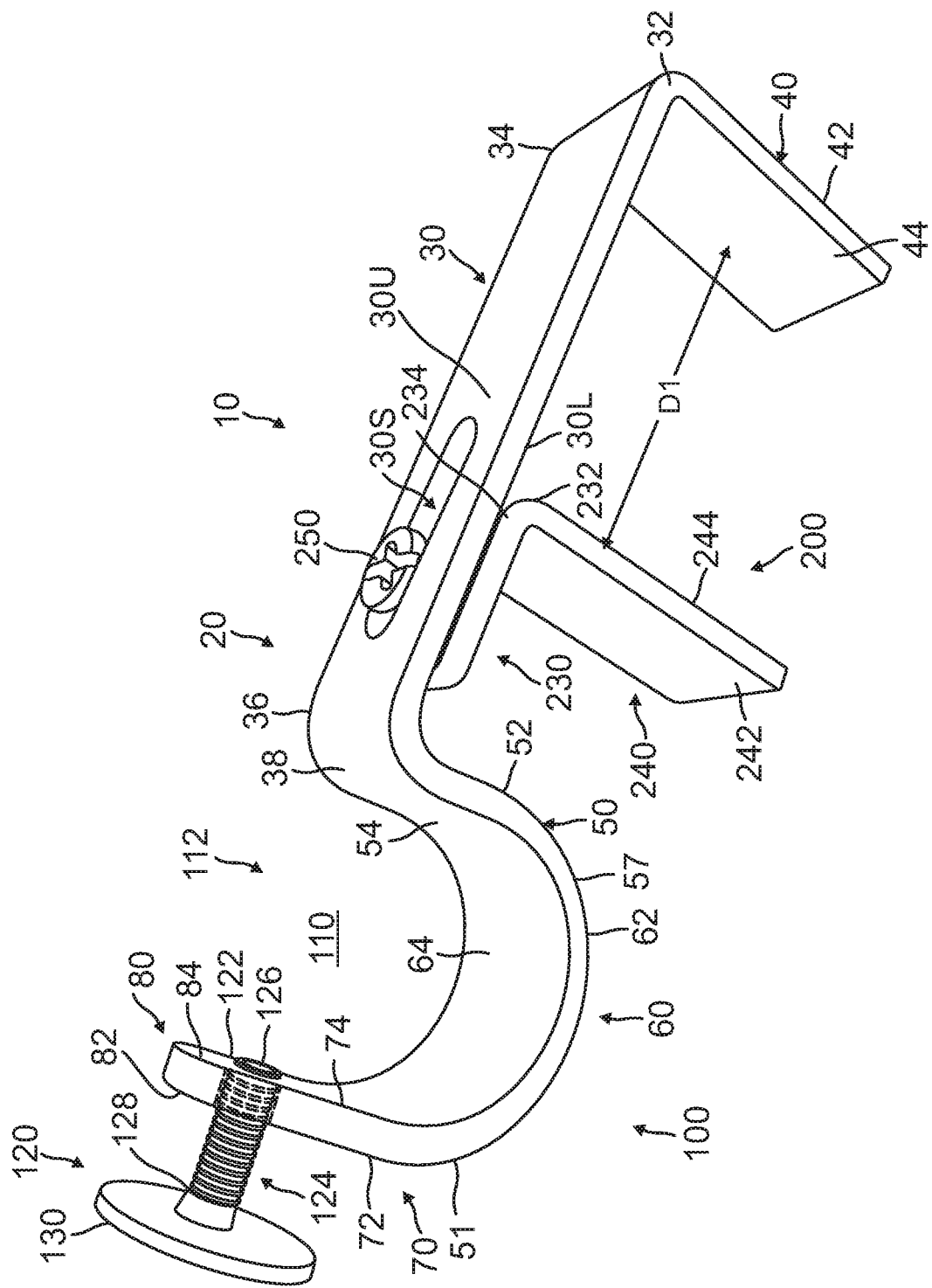
FIG. 1 is a top-left side perspective view of the present invention curtain rod bracket attachment member.
Figure 2:
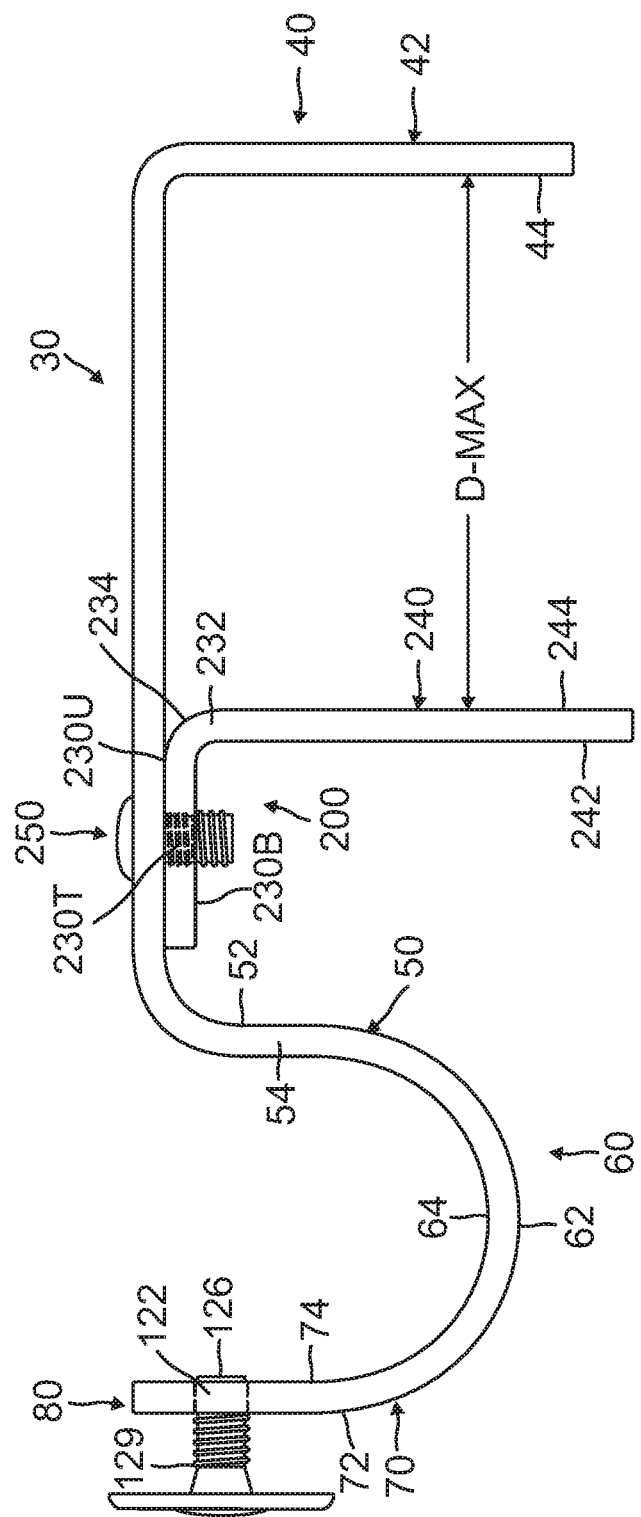
FIG. 2 is a left side view of the present invention curtain rod bracket attachment member illustrating the second transverse retaining wall of the second main section at a maximum distance from the first transverse retaining wall of the first main section.
Figure 3:
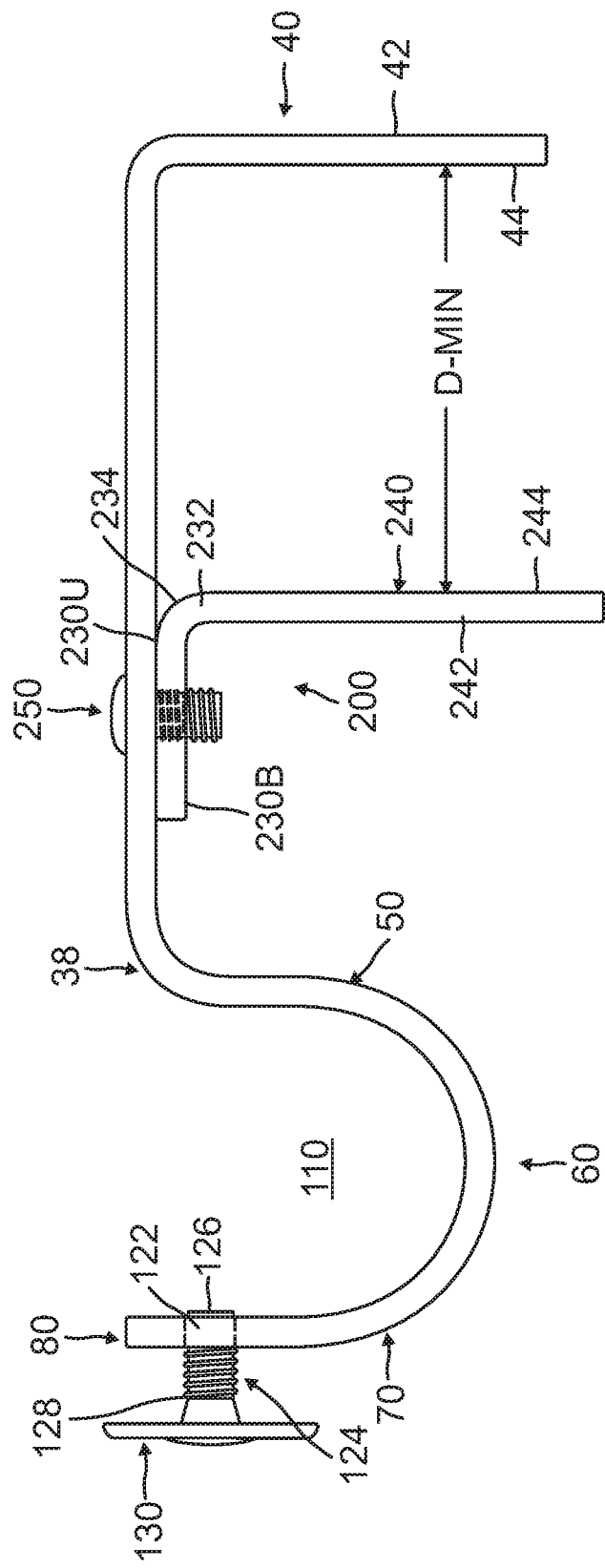
FIG. 3 is a left side view of the present invention curtain rod bracket attachment member illustrating the second transverse retaining wall of the second main section at a closest distance from the first transverse retaining wall of the first main section.

FIG. 1 is a top-left side perspective view of the present invention curtain rod bracket attachment member. FIG. 2 is a left side view of the present invention curtain rod bracket attachment member illustrating the second transverse retaining wall of the second main section at a maximum distance from the first transverse retaining wall of the first main section. FIG. 3 is a left side view of the present invention curtain rod bracket attachment member illustrating the second transverse retaining wall of the second main section at a closest distance from the first transverse retaining wall of the first main section.

The present invention is an apparatus which is a curtain rod bracket attachment member formed in two main sections which are slidably attached to each other. Referring to FIGS. 1, 2 and 3, there is illustrated the curtain rod bracket attachment member 10 which includes a first main section 20 having an elongated section 30 extending in a first curved portion 32 at a first end 34, the first curved portion 32 extending to a first transverse retaining member or first transverse retaining wall 40 which is oriented perpendicular to the elongated section 30. The first transverse retaining member or first transverse retaining wall 40 has an exterior surface 42 and an interior surface 44.

The elongation section 30 extends at its opposite second end 36 to a second curved portion 38 which extends to a second transverse portion or second transverse wall 50 having an exterior surface 52 and an interior surface 54 which extends to a semi-circular wall 60 (or a third curved section 57 between them) having an exterior surface 62 and an interior surface 64 which extends to a third transverse portion or third transverse wall 70 (or a fourth curved section 51 between them) having an exterior surface 72 and an interior surface 74 ending in an upper arcuate top wall 80 having an exterior surface 82 and an interior surface 84 (or alternatively, the third transverse wall 70 extends to the top without an upper arcuate top wall.

The second curved portion 38, the second transverse wall 50, the semi-circular wall 60 and the third transverse wall 70 are one integral unit forming a curtain rod retaining section 100 (curved sections 57 and 51, if included, are also part of one integral unit). The curtain rod retaining section 100 includes a partially open interior channel 110 with the interior surface 64 of a semi-circular section 60 and spaced apart interior surface 54 of second transverse wall 50 and interior surface 74 of third transverse wall 70 with an opening 112 between the second curved portion 38 and the interior surface 84 of the upper arcuate top portion 80, extending to the bottom semi-circular section 60, an elongated portion of a curtain rod (discussed later on in this patent application) is inserted through the opening and rests on the interior surface 64 of semi-circular wall 60 and between the interior surface 54 of second transverse wall 50 and interior surface 74 of third transverse wall 70.

A curtain rod retaining member 120 extends through a location between the third transverse wall 70 and the upper arcuate top portion 80 from respective exterior surfaces 72 and 82 to respective interior surfaces 74 and 84 and comprises a threaded opening 122 within the third transverse wall 70 and upper arcuate top portion 80 aligned with the second curved portion 38 with a threaded bolt 124 extending through the threaded opening 122, an interior end 126 of the threaded bolt 124 extending into the partially open interior channel 110 and an exterior end 128 of the threaded bolt 124 ending in a collar 129 of flat circular knob 130.

The elongated section 30 further includes an elongated slot 30S (or an elongated movement receiving section) extending from an upper surface 30U of the elongated section 30 to the lower surface 30L of the elongated slot 30S. The curtain rod attachment member 10 includes a second main section 200 having a short elongated section 230 extending to a fourth curved portion 232 at one end 234 and extending to a second transverse retaining member or second transverse retaining wall 240 which is oriented perpendicular to the short elongated section 230. The second transverse retaining wall 240 has an exterior surface 242 and an interior surface 244.

The short elongated section 230 has a threaded opening 230T (or a movement and retaining portion) extending from a top surface 230U to its bottom surface 230B. A short threaded bolt 250 (or affixing member) extends through the elongated slot 30S and is threaded into the threaded opening 230T. Alternatively, the elongated section includes an elongated movement receiving portion 30S extending through a thickness of the elongated section 30. The short elongated section includes a movement receiving and retaining portion 230T. An affixing member 250 movably extends through the elongated movement receiving portion 30S of the elongated section 30 and into and affixed to the movement receiving and retaining portion 230T of the short elongated section 230. An adjustable distance between the first transverse retaining wall and the second transverse retaining wall is facilitated by moving the affixing member 250 to any location within the elongated movement receiving member 30S causing the short elongated section 230 and the second transverse retaining wall 240 to move relative to the first transverse retaining wall 40 until a required distance between the interior surface of the first transverse retaining wall and the interior surface of the second transverse retaining wall is achieved.

The transverse retaining wall 240 is oriented parallel to and spaced apart from the first transverse retaining wall 40 with the short elongated section 230 extending away from the first transverse retaining wall 40. The distance "D-1" between the first transverse retaining wall 40 and the second transverse retaining wall 240 is modified/adjusted by loosening the short threaded bolt 250 and sliding the short elongated section 230 of the second main section 200 by movement of the position of the second main section 200 by sliding the short threaded bolt 250 along the elongated slot 30S and tightening the short threaded bolt 250 when the desired separation distance is achieved. The present invention provides this adjustable feature to account for different depth or this thickness of different hand rails.

Figure 4:
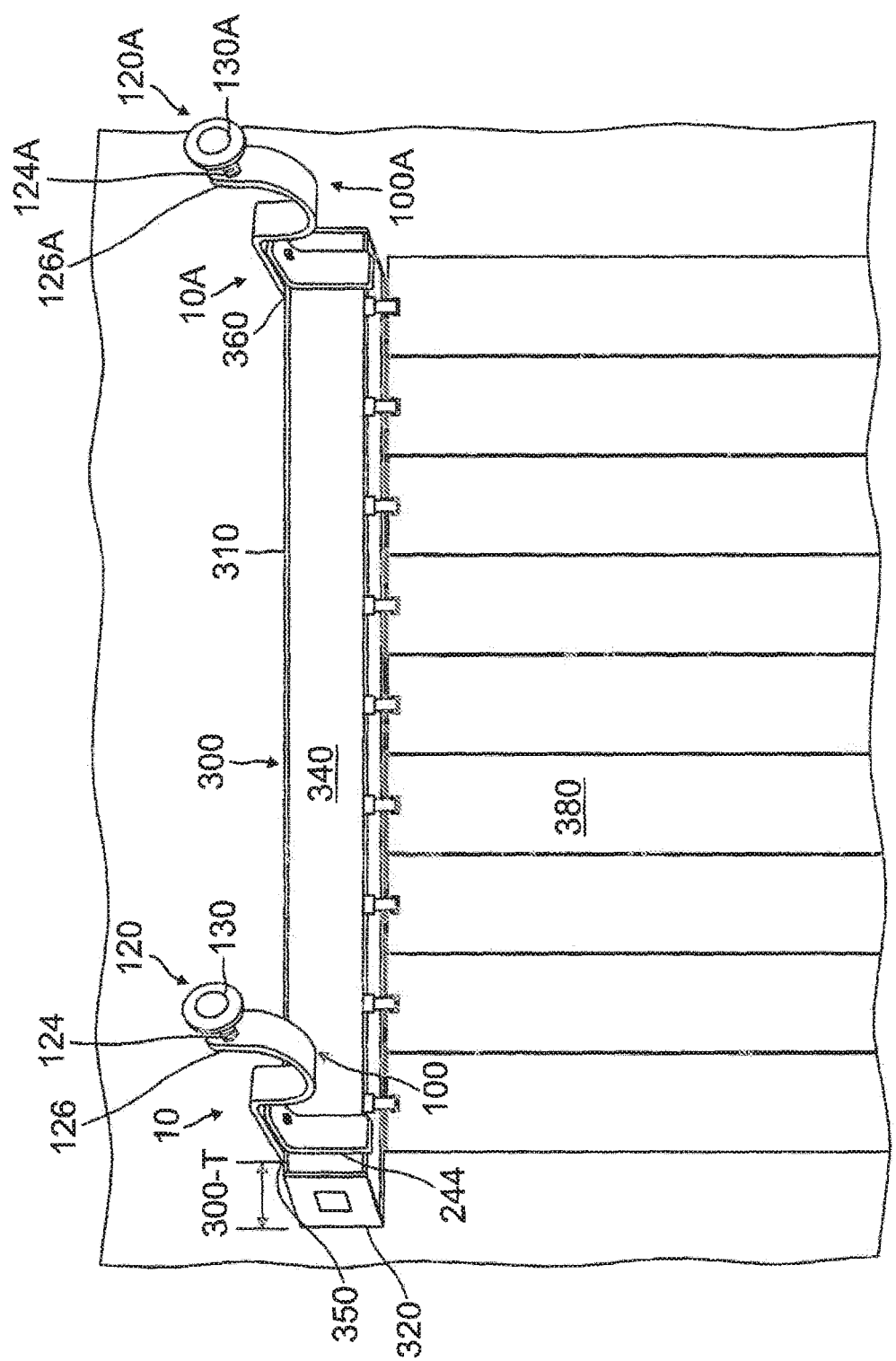
FIG. 4 is a front perspective view of a head rail with vertical blinds and a pair of spaced apart rod bracket attachment members attached at spaced apart locations on the head rail.
Figure 5:
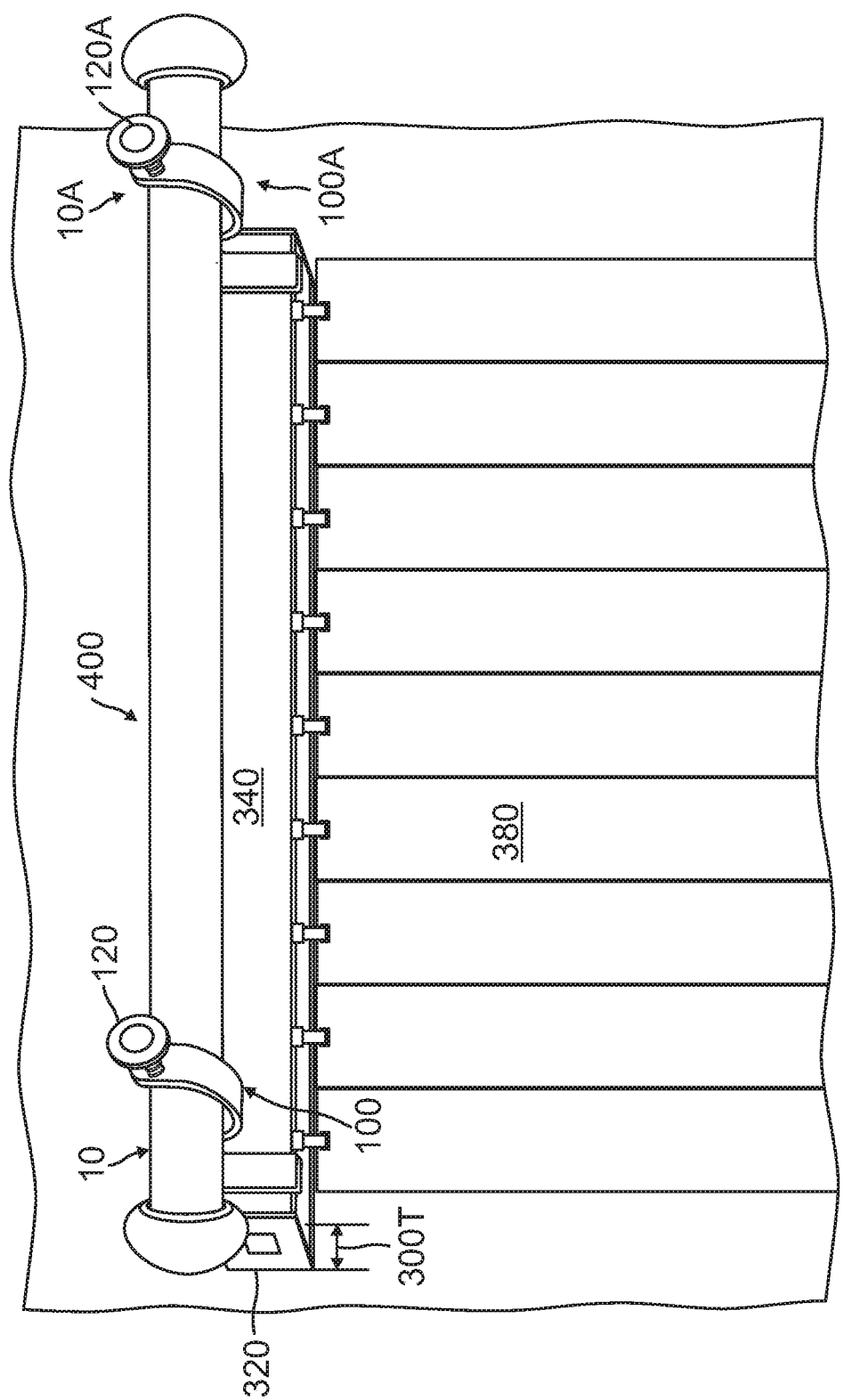
FIG. 5 is a front perspective view of a head rail with vertical blinds and a pair of spaced apart rod bracket attachment members attached at spaced apart locations on the head rail, with a curtain rod retained in the curtain rod retaining members of the rod bracket attachment members.

FIG. 4 is a front perspective view of a head rail 300 with vertical blinds 380 and a pair of spaced apart rod bracket attachment members 10 and 10A attached at spaced apart locations on the head rail 300. FIG. 5 is a front perspective view of a head rail 300 with vertical blinds 380 and a pair of spaced apart rod bracket attachment members 10 and 10A attached at spaced apart locations on the head rail 300, with a curtain rod 400 retained in the curtain rod retaining members 100 (and 100A) of the rod bracket attachment members 10 and 10A.

Referring to FIG. 4, in operation, the elongated section 30 of the first main section 20 is placed onto the top 310 of the head rail 300 so that the lower surface 30L of the elongated section 30 rests on the top 310 of the head rail 300, the interior surface 44 of the first transverse retaining wall 40 rests against a portion of the transverse rear surface 320 of the head rail 300 and a first or interior facing surface 244 of the second transverse retaining wall 240 rests against a portion of the front transverse surface 340 of the head rail 300, the short threaded bolt 250 is loosened to move second main section 200 until the interior facing surface 244 of the second transverse retaining wall 240 is press fit tightened against the portion of the front transverse surface 340 of the head rail 300 so that the head rail 300 is press fit retained between the interior surface of first transverse retaining wall 40 and the interior surface 244 second transverse retaining wall 240 with a portion of the lower surface 30L of the elongated section 30 of the first main section 20 resting on top 310 of a portion of the head rail 300. The curtain rod retaining section 100 extends in front of the head rail 300. The present invention curtain rod bracket attachment member 10 is designed to be adjustable to accommodate different depths or thicknesses 30-T of different head rails 300.

Referring to FIG. 4, two such curtain rod bracket attachment members 10 and 10A are fastened at spaced apart locations 350 and 360 of the head rail 300. Referring to FIG. 5, a curtain rod 400 is inserted into respective retaining sections 100 and 100A of respective parallel curtain rod bracket attachment members 10 and 10A. The respective knobs 130 and 130A of respective retaining members 120 and 120A cause the interior end 126 and 126A of threaded bolt 124 (and 124A not shown) to be fastened against a portion of the curtain rod 400 to prevent the curtain rod 400 from sliding on the curtain rod attachment members 10 and 10A.

The invention curtain rod bracket attachment member 10 is adjustable to conform to the depth or thickness 300-T from rear surface 320 to front surface 340 of a head rail 300 of vertical venetian blinds 380 or other vertical window shades or horizontal venetian shades or other horizontal window shades without requiring any structural modification to the head rail or any other portion of a wall of a room. The maximum distance between the interior surface 44 of first transverse retaining wall 40 and the interior surface 244 of second transverse retaining wall 240 is D-MAX (1.5 inches as illustrated in FIG. 2). The narrowest distance is D-MIN (one (1) inch as illustrated in FIG. 3).

It is a further object of the present invention to provide at least a pair of spaced apart curtain attachment rod members 10 and 10A which are removably attached to the head. The first main section 20 and second main section 200 of each curtain rod bracket attachment member 10 is made of material selected from the group consisting of metal and plastic.

Based on the above detailed description, other advantages of the present invention include inside mounted blinds curtain rod bracket 10 and 10A attachments which are
    specially engineered for blind attachment. In addition, the present invention facilitates inside mounted vertical rail blind attachments. The present invention is also adjustable to fit different head rail thicknesses.

Of course the present invention is not intended to be restricted to any particular form or arrangement, or any specific embodiment, or any specific use, disclosed herein, since the same may be modified in various particulars or relations without departing from the spirit or scope of the claimed invention here-in-above shown and described of which the apparatus or method shown is intended only for illustration and disclosure of an operative embodiment and not to show all of the various forms or modifications in which this invention might be embodied or operated.

What is claimed is:

1. A curtain rod bracket attachment member configured to be attached to a head rail, the curtain rod bracket attachment member comprising:
    (a) a first main section having a first elongated section extending to a first curved portion at a first end of the first elongated section, the first curved portion extending to a first transverse wall which is perpendicular to the first elongated section, the first transverse wall having an interior surface, the first elongated section extending to a second curved portion at a second end of the first elongated section, an elongated slot formed within the first elongated section between the first and second ends of the first elongated section, the elongated slot extending from a top surface of the first elongated section to a bottom surface of the first elongated section;
    (b) the second curved portion extending to a second transverse wall, the second transverse wall extending to a first end of a semi-circular wall, the semi-circular wall extending to a third transverse wall at a second end of the semi-circular wall, the third transverse wall having an upper arcuate top wall edge;
    (c) the second curved portion, the second transverse wall, the semi-circular wall, and the third transverse wall are formed as an integral unit defining a curtain rod retaining section, the curtain rod retaining section forming a partially open interior chamber, the partially open interior chamber having an open top extending from an opening between an interior surface of the third transverse wall and an interior surface of the second curved portion and terminating at a bottom closed portion defined by an interior surface of the semi-circular wall;
    (d) a curtain rod retaining member including a threaded shank and a knob integrally formed with an exterior end of the threaded shank, an interior end of the threaded shank positioned within the partially open interior chamber and adjacent the open top, the threaded shank threaded through an interior threaded wall opening formed in the third transverse wall below the upper arcuate top wall edge, the curtain rod retaining member configured to be fastened against a curtain rod to prevent the curtain rod from sliding on the curtain rod retaining section; and (e) a second main section having a second elongated section extending to a fourth curved portion, the second elongated section being shorter than the first elongated section, the second elongated section extending to a fourth transverse wall which is oriented perpendicular to the second elongated section, the fourth transverse wall having an exterior surface and an interior surface, the second elongated section having an interior threaded opening extending from a top surface of the second elongated section to a bottom surface of the second elongated section, the top surface of the second elongated section aligned with and below the bottom surface of the first elongated section, the interior threaded opening of the second elongated section aligned with the elongated slot in the first elongated section, a threaded bolt having a top end and a threaded body extending from the top surface of the first elongated section, the threaded bolt threaded into the interior threaded opening of the second elongated section, the fourth transverse wall oriented parallel to and spaced apart from the first transverse wall with the second elongated section extending away from the first transverse wall, a distance between the interior surface of the first transverse wall and the interior surface of the fourth transverse wall being adjustable by sliding the threaded bolt to any location within the elongated slot in the first elongated section, the distance being adjustable between a minimum value of 1 inch and a maximum value of 1.5 inches;

(f) wherein, when the threaded bolt is tightened to affix the second main section to the first main section, the interior surface of the first transverse wall is configured to press against a rear surface of the head rail, the interior surface of the fourth transverse wall is configured to press against a front surface of the head rail, and the bottom surface of the first elongated section is configured to press against a top surface of the head rail, such that the curtain rod bracket attachment member is allowed to be secured to the head rail.

2. The curtain rod bracket attachment member in accordance with claim 1, wherein the second main section is generally L-shaped.

3. The curtain rod bracket attachment member in accordance with claim 1, wherein the first main section and the second main section are made of metal or plastic.

4. The curtain rod bracket attachment member in accordance with claim 1, wherein the curtain rod bracket attachment member is configured to be removably affixed to the head rail without requiring screwing any portion of the curtain rod bracket attachment member to the head rail.

5. The curtain rod bracket attachment member in accordance with claim 1, wherein the curtain rod bracket attachment member is configured to be removably affixed to the head rail without requiring any drilling or hammering on the curtain rod bracket attachment member.

6. A curtain rod attachment kit comprising:

(i) a head rail for supporting window blinds, the head rail comprising a front surface, a rear surface spaced apart from the front surface, and a top surface connecting the front surface to the rear surface; and (ii) a plurality of curtain rod bracket attachment members, each of the plurality of curtain rod bracket attachment members comprising:

(a) a first main section having a first elongated section extending to a first curved portion at a first end of the first elongated section, the first curved portion extending to a first transverse wall which is perpendicular to the first elongated section, the first transverse wall having an interior surface, the first elongated section extending to a second curved portion at a second end of the first elongated section, an elongated slot formed within the first elongated section between the first and second ends of the first elongated section, the elongated slot extending from a top surface of the first elongated section to a bottom surface of the first elongated section;

(b) the second curved portion extending to a second transverse wall, the second transverse wall extending to a first end of a semi-circular wall, the semi-circular wall extending to a third transverse wall at a second end of the semi-circular wall, the third transverse wall having an upper arcuate top wall edge;

(c) the second curved portion, the second transverse wall, the semi-circular wall, and the third transverse wall are formed as an integral unit defining a curtain rod retaining section, the curtain rod retaining section forming a partially open interior chamber, the partially open interior chamber having an open top extending from an opening between an interior surface of the third transverse wall and an interior surface of the second curved portion and terminating at a bottom closed portion defined by an interior surface of the semi-circular wall;

(d) a curtain rod retaining member including a threaded shank and a knob integrally formed with an exterior end of the threaded shank, an interior end of the threaded shank positioned within the partially open interior chamber and adjacent the open top, the threaded shank threaded through an interior threaded wall opening formed in the third transverse wall below the upper arcuate top wall edge, the curtain rod retaining member configured to be fastened against a curtain rod to prevent the curtain rod from sliding on the curtain rod retaining section; and (e) a second main section having a second elongated section extending to a fourth curved portion, the second elongated section being shorter than the first elongated section, the second elongated section extending to a fourth transverse wall which is oriented perpendicular to the second elongated section, the fourth transverse wall having an exterior surface and an interior surface, the second elongated section having an interior threaded opening extending from a top surface of the second elongated section to a bottom surface of the second elongated section, the top surface of the second elongated section aligned with and below the bottom surface of the first elongated section, the interior threaded opening of the second elongated section aligned with the elongated slot in the first elongated section, a threaded bolt having a top end and a threaded body extending from the top surface of the first elongated section, the threaded bolt threaded into the interior threaded opening of the second elongated section, the fourth transverse wall oriented parallel to and spaced apart from the first transverse wall with the second elongated section extending away from the first transverse wall, a distance between the interior surface of the first transverse wall and the interior surface of the fourth transverse wall being adjustable by sliding the threaded bolt to any location within the elongated slot in the first elongated section, the distance being adjustable between a minimum value of 1 inch and a maximum value of 1.5 inches;

(f) wherein, when the threaded bolt is tightened to affix the second main section to the first main section, the interior surface of the first transverse wall is configured to press against the rear surface of the head rail, the interior surface of the fourth transverse wall is configured to press against the front surface of the head rail, and the bottom surface of the first elongated section is configured to press against the top surface of the head rail, such that each curtain rod bracket attachment member is allowed to be secured to the head rail.

7. The curtain rod attachment kit in accordance with claim 6, wherein the second main section of each of the plurality of curtain rod bracket attachment members is generally L-shaped.

8. The curtain rod attachment kit in accordance with claim 6, wherein the first main section and the second main section of each of the plurality of curtain rod bracket attachment members are made of metal or plastic.

9. The curtain rod attachment kit in accordance with claim 6, wherein each of the plurality of curtain rod bracket attachment members is configured to be removably affixed to the head rail without requiring screwing any portion of each of the plurality of curtain rod bracket attachment members to the head rail.

10. The curtain rod attachment kit in accordance with claim 6, wherein each of the plurality of curtain rod bracket attachment members is configured to be removably affixed to the head rail without requiring any drilling or hammering on each of the plurality of curtain rod bracket attachment members.

11. The curtain rod attachment kit in accordance with claim 6, wherein the plurality of curtain rod bracket attachment members are configured to be affixed to the head rail and spaced apart from each other.

12. The curtain rod attachment kit in accordance with claim 6, wherein the plurality of curtain rod bracket attachment members consist of two curtain rod bracket attachment members.

* * * * *